May 14, 1929.  W. L. LINDGREN  1,712,924
BRUSH MOUNTING FOR VACUUM CLEANERS, ETC
Original Filed Dec. 8, 1924
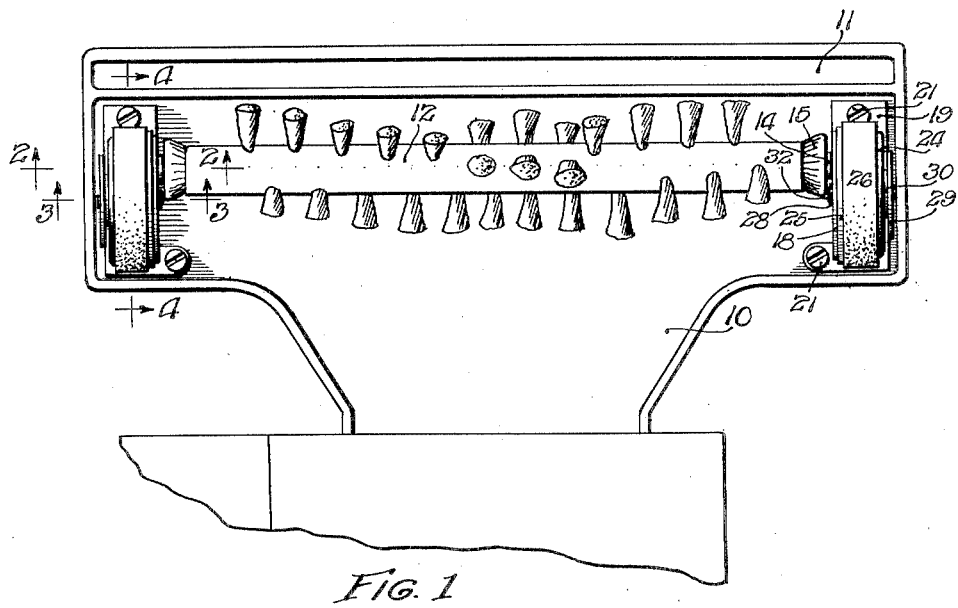
FIG. 1
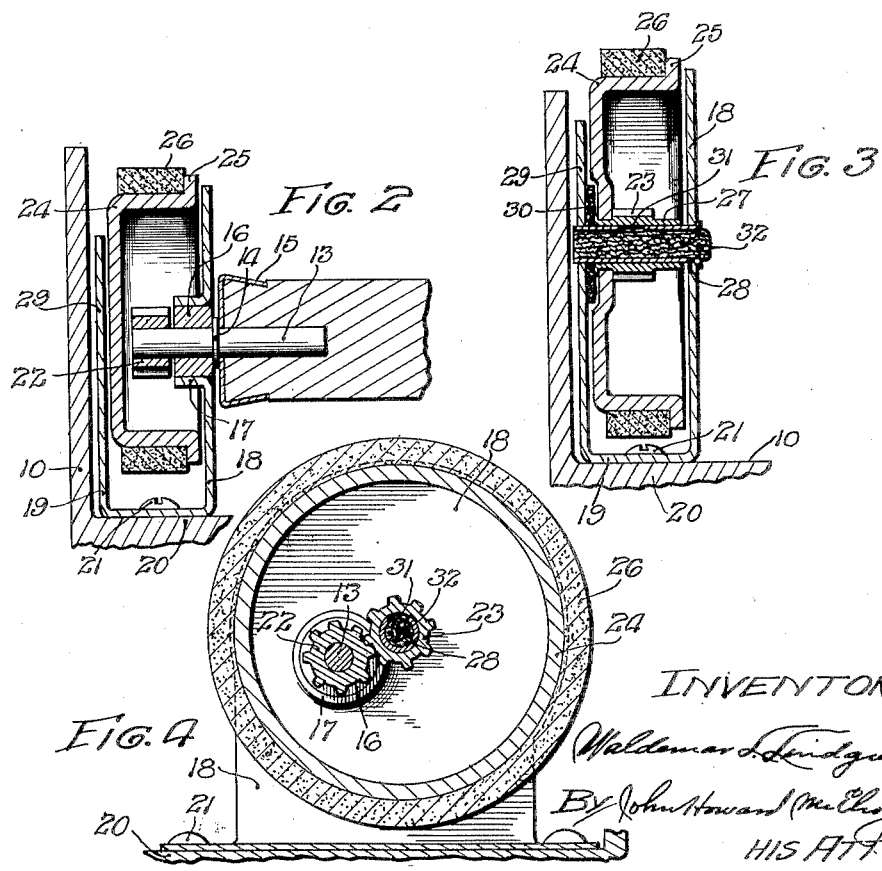
INVENTOR:
Waldemar L. Lindgren
By John Howard McElroy
HIS ATTY.

Patented May 14, 1929.

UNITED STATES PATENT OFFICE.

1,712,924

WALDEMAR L. LINDGREN, OF WAUKEGAN, ILLINOIS, ASSIGNOR TO ALFRED A. NORTON, TRUSTEE, OF CHICAGO, ILLINOIS.

BRUSH MOUNTING FOR VACUUM CLEANERS, ETC.

Application filed December 8, 1924, Serial No. 754,508. Renewed March 21, 1929.

My invention is concerned with brush mountings for vacuum cleaners, etc., and is designed to produce a device of the class described that shall be simple in its construction, withal durable, and which will be protected from dirt getting into the gearing and bearings, so that it will continue to run easily and operate efficiently. It is further concerned with a device of the class described that shall be efficiently lubricated.

To illustrate my invention, I annex hereto a sheet of drawings, in which the same reference characters are used to designate identical parts in all the figures, of which,—

Fig. 1 is an inverted plan view; and

Figs. 2, 3 and 4 are vertical sections on the lines 2—2, 3—3 and 4—4, respectively, of Fig. 1, but on a larger scale.

In Fig. 1, I have shown my improvements as applied to a vacuum cleaner such as that shown in my Patent No. 1,458,714, dated June 12, 1923, and in which 10 represents the nozzle casing, the nozzle proper being formed by the narrow passage 11 which comes substantially in contact with the floor in advance of the customary rotary brush 12, the novel mounting of which constitutes the subject matter of my present invention.

The brush shaft 12 is, as is customary, formed of wood, and has secured in the ends thereof the bearing rod or extension 13, which is constructed of metal, and is securely fastened in the wooden shaft 12, its exact position being determined by the collar 14, which engages the thin metallic cap 15 which I preferably crimp on the end of the roller. The bearing shaft or stud 13 rotates in or with a hard-wood collar 16, which is mounted or journaled in a bearing 17 formed by turning inwardly an annular flange formed from the body of the inner arm 18 of the yoke-like bearing bracket 19, which is preferably stamped up from sheet metal, and has the central horizontal portion thereof engaging and secured to the horizontal roof 20 of the casing 10 by the screws 21, as seen in the various figures. On the outer end of the spindle or stud 13 is rigidly secured the spur-gear pinion 22, which meshes with a spur-gear pinion 23 secured on or forming a part of the hub of the ground wheel 24, which preferably consists of a shallow, metallic cup provided with the flange 25 against which is secured the rubber tire 26. This wheel 24 is preferably stamped up from sheet metal, and the pinion 23 is preferably formed integral with or as a part of the sleeve 27, the outer end of which is passed through and riveted to the centrally located aperture formed in the body of the wheel 24 for that purpose. This hub or sleeve 27 is journaled on a bearing sleeve 28, which consists of a thin tube preferably riveted at one end to the arm 18 of the bearing bracket, while its other end extends through the other arm 29 of said bracket. To keep the dust out of the bearing, I preferably place a felt washer 30 on the bearing sleeve 28 between the adjacent faces of the bracket arm 29 and of the ground wheel 24. It will be noted that the arm 18 of the bearing bracket covers the entire open side of the ground wheel 24 and prevents dust from getting into the gears 22 and 23.

As a simple and efficient means of lubricating these bearings for a considerable time without any attention, I form in the bearing sleeve 28 a small aperture 31, and in the sleeve I place a train or filament 32 of some cord or fabric and saturate the same before its insertion with a suitable lubricant, so that said lubricant can slowly but effectively work through the aperture 31 and lubricate the bearing for the ground wheel.

While I have described the mounting at one end only, it will be understood that the same bearing will ordinarily be employed at the other end.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a framework, of a bracket secured to the framework and having a pair of arms extending therefrom, a bearing member mounted at its ends in the arms of the bracket so that it is supported at both ends, a ground wheel journaled on said bearing member and having a gear pinion forming the hub thereof, a brush shaft having a spindle at the end thereof journaled in a bearing formed in the adjacent arm of the bracket, and a gear pinion on the spindle meshing with the other gear pinion, for the purpose described.

2. In a device of the class described, the combination with a framework, of a bracket secured to the framework and having a pair of arms extending therefrom, a bearing member mounted at its ends in the arms of the bracket, a hollow ground wheel having one side thereof open and having a gear pinion forming the hub thereof journaled on said bearing member, a brush shaft having a spindle at the end thereof journaled in a bearing formed in the adjacent arm of the bracket, said adjacent and inner arm of the bracket substantially closing the open side of the ground wheel, and a gear pinion on the spindle meshing with the other gear pinion for the purpose described.

In witness whereof, I have hereunto set my hand this 29th day of November, 1924.

WALDEMAR L. LINDGREN.